United States Patent
Kim et al.

(10) Patent No.: US 8,277,698 B2
(45) Date of Patent: *Oct. 2, 2012

(54) INFRARED CURABLE INK COMPOSITION FOR COLOR FILTER AND COLOR FILTER

(75) Inventors: Mi-Kyoung Kim, Daejeon (KR); Sun-Hwa Kim, Daejeon (KR); Han-Soo Kim, Daejeon (KR); Dae-Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/833,657

(22) Filed: Jul. 9, 2010

(65) Prior Publication Data

US 2011/0005427 A1   Jan. 13, 2011

(30) Foreign Application Priority Data

Jul. 10, 2009 (KR) .......... 10-2009-0063160
Jul. 10, 2009 (KR) .......... 10-2009-0063161
Jul. 8, 2010 (KR) .......... 10-2010-0065873

(51) Int. Cl.
*G02B 5/23* (2006.01)
*G02F 1/1335* (2006.01)
*C04B 33/00* (2006.01)

(52) U.S. Cl. .......... 252/586; 106/31.46; 252/500; 252/582; 349/106; 427/162; 430/7; 524/100; 524/104

(58) Field of Classification Search .......... 252/586, 252/500, 582; 524/100, 558, 104; 349/106; 430/7, 270.1; 522/33, 63, 65; 106/31.46; 427/162

See application file for complete search history.

(56) References Cited

U.S. PATENT DOCUMENTS

| | | | |
|---|---|---|---|
| 6,929,827 B2 | 8/2005 | Yonehara | |
| 2002/0128351 A1* | 9/2002 | Kiguchi et al. | 523/161 |
| 2006/0084736 A1* | 4/2006 | Jang et al. | 524/356 |
| 2008/0226993 A1 | 9/2008 | Kim et al. | |
| 2010/0163812 A1* | 7/2010 | Kim et al. | 252/586 |

FOREIGN PATENT DOCUMENTS

| | | | |
|---|---|---|---|
| JP | 07-196968 | | 8/1995 |
| JP | 2009-074010 | | 4/2009 |
| KR | 10-0847850 B1 | | 7/2008 |
| KR | 10-2008-0083944 | | 9/2008 |
| WO | WO 97/07169 | * | 2/1997 |

* cited by examiner

*Primary Examiner* — Bijan Ahvazi
(74) *Attorney, Agent, or Firm* — McKenna Long & Aldridge LLP

(57) ABSTRACT

The present invention relates to an infrared curable ink composition for a color filter. The ink composition according to the present invention includes a melamine compound and an epoxy compound, and thus can be cured for a short time, thereby being used in the infrared curing process, and reducing the production process and time required for the color filter production. In addition, the color filter produced by the ink composition according to the present invention has excellent chemical resistance and heat resistance, thereby being applied to various electronic devices such as liquid crystal display device.

13 Claims, No Drawings

INFRARED CURABLE INK COMPOSITION FOR COLOR FILTER AND COLOR FILTER

This application claims the benefit of priority to Korean Application No. 10-2009-0063160, filed on Jul. 10, 2009; Korean Application No. 10-2009-0063161, filed on Jul. 10, 2009; and Korean Application No. 10-2010-0065873, filed on Jul. 8, 2010, which are all hereby incorporated by reference in their entireties.

BACKGROUND OF THE INVENTION

1. Field of the Invention

The present invention relates to an infrared curable ink composition for a color filter, and more particularly, an infrared curable ink composition for a color filter including a melamine compound and an epoxy compound.

The present application claims priority to Korean Patent Application Nos. 10-2009-0063160 filed on Jul. 10, 2009, 10-2009-0063161 filed on Jul. 10, 2009 and 10-2010-0065873 filed on Jul. 8, 2010, the disclosure of which is incorporated herein by reference in its entirety.

2. Description of the Related Art

Display device is essential for the age of information society and multimedia, and recently, it is made to be small and thin in size and light in weight, thereby being applied to a variety of fields. With the advance of semiconductor technology, the concerns about flat panel display (FPD) applicable to various fields are growing, and there have been developed many different types of flat panel display, including liquid crystal display (LCD), plasma display panel (PDP), organic electroluminiscent display (OELD) or the like.

In the liquid crystal display device, an electric voltage is applied to vary the molecular arrangement of the liquid crystal layer, and therefore light transmittance is controlled to display desired information. To develop color, the liquid crystal display device is provided with color filters of the three colors including red, green and blue. When light transmittance is controlled by altering the liquid crystal arrangement, light passing through each color filter is controlled, such a way that, color is developed.

Typically, color filters are located on a glass substrate, and three types of the color filters should be regularly and elaborately distributed in a specific shape. As the method of forming three types of the color filter, a printing method, an electrodeposition method, a photolithography method, and an ink-jet printing method are reported.

First, the photolithography method is as follows. Pixel regions are defined on a transparent substrate, and black matrices for shielding a light source between the pixel regions are formed on the transparent substrate. Next, a color resist is coated to cover the entire surface of the substrate including the black matrices, and a color filter pattern of a specific color (for example, a red color filter pattern) is formed by exposing the color resist using a mask. Subsequently, a red color filter is formed on the glass substrate through development and curing processes. Sequentially, other color filters are also formed by repeatedly performing the processes. However, this method is problematic in that its efficiency is reduced by large amounts of loss of materials and the process is complicated.

Second, the ink-jet printing method is a method of directly printing color filter materials, and has advantages that the process can be simplified, loss of materials can be prevented, and the process cost can be also reduced without the need of photolithography process. In the ink-jet printing method, a black matrix pattern is formed on the glass substrate, and the formed pixel space is filled with ink including a pigment. The volatile solvent contained in the ink is evaporated through the process of curing ink (baking process), and a color filter is formed by cross-linking process.

The process of manufacturing a color filter is exposed to a lot of chemicals, and thus the formed color filter is required to have chemical resistance during the process. The chemical resistance is determined by the cross-linking density of color filter ink film, and thus the process of curing ink applied on the glass substrate is a very important process during the manufacture of the color filter.

In the conventional process of curing ink, that is, baking process, a post-baking process employing a thermal convection method was used. In this process, the substrate is loaded in a chamber, and heated by thermal convection method, so that cross-linking reaction in the ink occurs and the solvent is volatilized. That is, ink for a color filter is jetted on the glass substrate, and then heating is performed at a predetermined temperature for solvent evaporation, thereby stabilizing the ink on the substrate. However, the post-baking process employing the thermal convection method is problematic in that it must employ a gas becoming a convection mediator within the chamber and requires a significantly long time in order to cure the color filter film. During the baking process, various foreign materials are generated on the substrate, and in particular, during the post-baking process employing the thermal convection method, the possibility of generating foreign materials increases due to a long baking time. Thus, the process has drawbacks that much time and operating costs are required for the production process, resulting in low efficiency.

Therefore, instead of the post-baking process employing the thermal convection method, alternative processes have been developed, and Korean Patent Laid-Open Publication No. 10-2008-0083944 discloses an IR Curing device capable of performing the post-baking process by infrared radiation with high heat transfer.

Unlike the conventional post-baking process using the thermal convection method, the infrared curing process employs infrared rays having a high output and an excellent heating characteristic. In particular, it is characterized by a rapid curing performance, thereby reducing production time and costs, and improving, production yield. Thanks to a short curing time, the generation of foreign materials on the substrate can be also reduced during the curing process.

Unlike the post-baking process using the thermal convection method, the infrared curing process is performed for a short curing time (approximately 1 to 10 min) at high temperature (250° C. or higher). Therefore, the ink for a color filter used in this process is required to have physical and chemical characteristics different from those used in the post-baking process using the thermal convection method.

In general, the ink for a color filter is characterized in that it has a higher pigment concentration and higher viscosity due to high solid content, compared to the photoresist (PR) for a color filter. The chemical resistance of the ink for a color filter is determined by the strength and cross-linking density of ink film. Because of its higher pigment content, a relatively small amount of binder and cross-linking agent are contained, leading to deterioration in the chemical resistance of the ink film. The deterioration in the chemical resistance generates problems that pigments contained in the color filter film are melted out upon post-processing such as alignment film formation during the production of color filter, leading to deterioration in color development or influence on liquid crystal operation. In particular, a red ink is problematically weak in chemical resistance.

Accordingly, the ingredients contained in the ink for a color filter should have excellent chemical resistance, and maintain high cross-linking density even at a small amount, and not deteriorate pigment dispersibility when added to the ink. In addition, those possessing an extremely high viscosity should not be used, because they deteriorate the jetting property. The ink for a color filter used in the infrared curing process has a very short curing time. Thus, if the cross-linking process is not performed rapidly, its chemical resistance is deteriorated. Therefore, the ink for a color filter is required to have a rapid cross-linking characteristic.

The conventional ink compositions for a color filter are described in Japanese Patent Laid-Open Publication Nos. 2009-74010 and 1995-196968. However, these ink compositions for a color filter are not used for the infrared curing process, and not suitable for the 3 minute curing process such as infrared curing process.

Accordingly, there is a need for an ink composition for a color filter having excellent chemical resistance, in which it can be sufficiently cured for a short period of time as in the infrared curing process. Therefore, the present inventors have made studies to develop an ink composition for a color filter, which is suitable for the infrared curing process and has excellent chemical resistance, thereby completing the present invention.

SUMMARY OF THE INVENTION

The present invention provides an infrared curable ink composition for a color filter showing excellent chemical resistance through an infrared curing process for a short curing time.

Further, the present invention provides a color filter having excellent chemical resistance, which is produced by the infrared curable ink composition for a color filter.

Further, the present invention provides a liquid crystal display device including the color filter.

According to an aspect of the present invention, there is provided an infrared curable ink composition for a color filter, including one or more melamine compounds represented by the following Formula 1; and an epoxy compound.

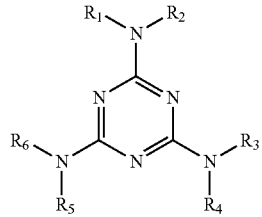

[Formula 1]

wherein $R_1$, $R_2$, $R_3$, $R_4$, $R_5$ and $R_6$ are each independently selected from the group consisting of functional groups including hydrogen, a hydroxy group, a $C_1$-$C_6$ alkyl group, a $C_1$-$C_6$ alkoxy group, a $C_1$-$C_6$ carboxyl group, a $C_1$-$C_6$ alkoxy methyl group, a $C_1$-$C_6$ alcohol group, a phenyl group, an acryl group and a vinyl group, and at least one of $R_1$ to $R_6$ is a $C_1$-$C_6$ alcohol group or a $C_1$-$C_6$ alkoxy methyl group.

As used herein, the term "infrared curing" or "infrared curing process" means that infrared rays having a high output and an excellent heating characteristic are used to cure the ink by evaporating a solvent contained in the ink composition for a color filter, and the process is performed for a short curing time (approximately 100 sec to 5 min) unlike the conventional post-baking process (approximately 30 min to 60 min).

As used herein, the term "ink for a color filter" refers to an ink for the production of a color filter that is used in liquid crystal display device. When the ink for a color filter is jetted on a substrate by an ink-jet method, and then cured, a color filter is formed on the substrate.

The epoxy compound used in the present invention is a compound that is used in the ink composition for a color filter having excellent chemical resistance, and characterized in that it is rapidly reacted and cured with a melamine compound during the infrared curing process.

From the viewpoint that the curing reaction occurs rapidly, any epoxy compound can be used without limitation, as long as it contains two or more epoxy groups in the molecule, for example, one or more selected from the group consisting of bisphenol A-type epoxy, bisphenol F-type epoxy, brominated bisphenol A-type epoxy, bisphenol S-type epoxy, diphenyl ether-type epoxy, hydroquinone-type epoxy, naphthalene-type epoxy, biphenyl-type epoxy, fluorene-type epoxy, novolac-type epoxy, tris hydroxy phenyl methane-type epoxy, trifunctional-type epoxy, tetraphenylethane-type epoxy, dicyclo pentadiene phenol-type epoxy, hydrogenated bisphenol A-type epoxy, bisphenol A-containing nuclear polyol-type epoxy, polypropylene glycol-type epoxy, glycidyl ester-type epoxy, glycidyl amine-type epoxy, linear aliphatic epoxy, alicylic epoxy, and heterocyclic epoxy. Preferably, the epoxy compound is novolac-type epoxy, for example, may be one or more epoxy compounds selected from the group consisting of phenol novolac-type epoxy, cresol novolac-type epoxy, BPA-type novolac and substituted epoxy. More preferably, the epoxy compound is phenol novolac-type epoxy, such as EPPN-502H and EPPN-501H (trade name), but is not limited thereto.

The epoxy compound is preferably contained in an amount of 0.5 to 10% by weight, and more preferably 1 to 8% by weight, based on the total weight of the ink composition for a color filter. If the epoxy content is less than 0.5% by weight, the amount of the epoxy compound is not sufficient to deteriorate the cross-linking density. If the epoxy content is more than 10% by weight, storage stability of the ink composition may deteriorate.

The melamine compound used in the present invention is a compound that is used in the ink composition for a color filter having excellent chemical resistance, and even if a small amount thereof is used, high cross-linking density is maintained, pigment dispersibility is not deteriorated, and it is rapidly reacted and cured with the epoxy compound during the infrared curing process.

From the viewpoint that the curing reaction occurs rapidly, the melamine compound may be a melamine compound represented by Formula 1. More preferably, in the definition of Formula 1, $R_1$, $R_2$, $R_3$, $R_4$, $R_5$ and $R_6$ may be each independently selected from the group consisting of hydrogen, a hydroxy group, a $C_1$~$C_6$ alkyl group, a $C_1$~$C_6$ alkoxy group, a methylalcohol group, a $C_1$~$C_6$ alkoxy methyl group and an acryl group.

Preferably, the melamine compound may be a compound represented by the following Formula 2 or 3.

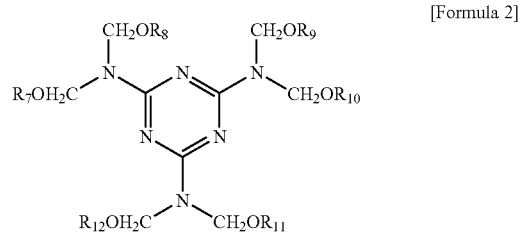

[Formula 2]

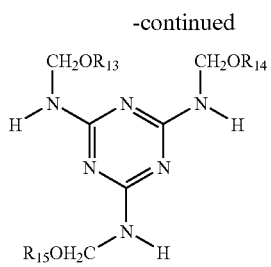

[Formula 3]

wherein $R_7$, $R_8$, $R_9$, $R_{10}$, $R_{11}$, $R_{12}$, $R_{13}$, $R_{14}$ and $R_{15}$ may be each independently selected from the group consisting of hydrogen and a $C_1$~$C_6$ alkyl group.

More preferably, the melamine compound may be selected from the group consisting of methoxymethyl melamine, ethoxymethyl melamine, and butoxymethyl melamine. The melamine compound may be readily purchased from commercially available source. A methylol derivative may be obtained by condensation of melamine with formalin, and methylol ether derivatives thereof may be obtained by reacting the methylol derivative thereof with various alcohols by the known method. More specifically, the melamine compound may be exemplified by Cymel 303, Cymel 350, Cymel 3745, Cymel MM-100, Cymel 370, Cymel 373, Cymel 3749, Cymel 327, Cymel 323, Cymel 325, Cymel 328, Cymel 385, Cymel 1116, Cymel 1130, Cymel 1133, Cymel 1161, Cymel 1168, Cymel 3020, Cymel 615, Cymel 683, Cymel 688, Cymel MB-11-B, Cymel MB-14-B, and Cymel 1158 (trade names) manufactured by Cytec Industries Inc.

The melamine compound is contained in an amount of 0.5 to 10% by weight, and more preferably 1 to 8% by weight, based on the total weight of the ink composition for a color filter. If the melamine content is less than 0.5% by weight, the cross-linking density is not sufficient to deteriorate the chemical resistance. If the melamine content is more than 10% by weight, the film strength is reduced.

The epoxy compound and the melamine compound are rapidly cross-linked and cured during the infrared curing process, and therefore, an ink film having excellent chemical resistance can be obtained. From this viewpoint, a molar ratio of the melamine compound and the epoxy compound is preferably 0.5 to 4:1. If the ratio of the melamine compound to the epoxy compound is not within the range, a sufficient film strength is not ensured, or improvement in the chemical resistance can be reduced.

Meanwhile, the infrared curable ink composition for a color filter according to the present invention may further include a pigment; a pigment dispersant; and a solvent.

As used herein, the term "pigment" refers material that functions as a coloring agent to express the color of liquid crystal display device.

Two or more types of organic or inorganic pigments can be mixed with each other, and used as the pigment, but the preferred pigment is the organic pigment having excellent color developing property and heat resistance.

Hereinbelow, specific examples of the pigment used in the ink composition of the present invention are represented by the color index number.

Examples of the red pigment may include C. I. Pigment Red 7, 14, 41, 48:1, 48:2, 48:3, 48:4, 81:1, 81:2, 81:3, 81:4, 146, 168, 177, 178, 179, 184, 185, 187, 200, 202, 208, 210, 246, 254, 255, 264, 270, 272, 279 or the like, and among them, C. I. Pigment Red 177 and 254 are preferred in terms of high brightness and high contrast.

Examples of the green pigment may include C. I. Pigment Green 7, 10, 36, 37, 58 or the like, and among them, C. I. Pigment Green 7, 36, and 58 are preferred in terms of high brightness and high contrast.

Examples of the yellow pigment may include C. I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 6300·61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 139, 147, 150, 151, 152, 153, 154, 155, 156, 161, 162, 164, 166, 167, 168, 169, 170, 171, 1572, 173, 174, 175, 176, 177, 179, 180, 181, 182, 185, 187, 188, 193, 194, 198, 199, 213, 214 or the like, and among them, C. I. Pigment Yellow 138, 139, and 150 are preferred in terms of high brightness and high contrast.

Examples of the blue pigment may include C. I. Pigment Blue 15, 15:1, 15:2, 15:3, 15:4, 15:6, 16, 22, 60, 64 or the like.

Examples of the violet pigment may include Violet 23 or the like.

Examples of the cyan pigment may include C. I. Pigment Blue 15:3 or a mixture of C. I. Pigment Blue 15:3 and C. I. Pigment Green 7.

Examples of the magenta pigment may include mixtures of C. I. Pigment Red 81, 81:1, 81:2, 81:3, 81:4, 122, 192, 202, 207, or 209, and C. I. Pigment Violet 19.

In the composition of the present invention, a colorant may be used in combination, in addition to the pigment. The examples of the colorant may include dye, natural colorant or the like.

The pigment is preferably contained in an amount of 5 to 20% by weight, based on the total weight of the ink composition for a color filter. If the pigment content is less than 5% by weight, it is difficult to obtain the desired color reproduction range. If the pigment content is more than 20% by weight, the curing property is remarkably deteriorated, and adhesion property is reduced.

As used herein, the term "pigment dispersant" refers to a material that uniformly and finely disperses a pigment in the ink composition for a color filter so as to improve the performance of liquid crystal display device upon color development.

Non-limiting preferred examples of the dispersant include surfactants such as cationic, anionic, nonionic, cationic silicone-based, and fluorine-based surfactants, or polymer surfactants (polymer dispersant). For example, polyethylene imine-based, urethane resin-based, acryl resin-based or polyester-based polymer dispersants may be used.

The pigment dispersant is preferably contained in an amount of 1 to 15% by weight, and more preferably 2 to 10% by weight, based on the total weight of the ink composition for a color filter. If the content of pigment dispersant is less than 1% by weight, the pigment dispersibility may be not sufficient. If the content of pigment dispersant is more than 15% by weight, the viscosity of ink is increased to deteriorate the jetting property.

As used herein, the term "solvent" refers to a material that functions to disperse the pigment in the ink composition for a color filter and facilitates to jet (discharge) the ink without drying the ink in a nozzle. The solvent to be used in the present invention contains 70% or more, and preferably 80% or more of a solvent having a high boiling point of 180° C. or higher.

As a main solvent, the solvent having a boiling point of 200° C. or higher prevents the end of the nozzle from drying to facilitate jetting (discharge) of the ink. It is preferable that the solvent has a boiling point of 200° C. to 300° C. and a vapor pressure of 0.5 mmHg or less at room temperature.

Non-limiting examples thereof may include one or more selected from the group consisting of ethylene glycol monobutyl ether acetate, diethylene glycol monobutyl ether acetate, diethylene glycol monoethyl ether acetate, diethylene glycol monomethyl ether acetate, dipropylene glycol monomethyl ether acetate, dipropylene glycol ethyl ether acetate, dipropylene glycol propyl ether acetate, dipropylene glycol monobutyl ether acetate, diethylene glycol monomethyl ether, diethylene glycol monoethyl ether, diethylene glycol monopropyl ether, diethylene glycol monobutyl ether, diethylene glycol monohexyl ether, triethylene glycol monomethyl ether, triethylene glycol monoethylether, triethylene glycol monobutylether, triethylene glycol monopropyl ether, dipropylene glycol monobutyl ether, tripropylene glycol monomethyl ether and tripropylene glycol monobutyl ether, but are not limited thereto.

In addition, in term of solubility, pigment dispersibility and convenience of coating film formation, solvents having a low boiling point (200° C. or lower) may be used in combination. That is, the solvent of the present invention may be mixed with the solvent having a low boiling point, as long as it does not deteriorate advantages of the solvent having a high boiling point and low viscosity.

Specific examples of the solvents having a low boiling point may include glycol ether such as diethylene glycol dimethylether, diethylene glycol diethylether; ketones such as methylethylketone, cyclohexanone, and 4-hydroxy-4-methyl-2- pentanone; esters such as methyl, ethyl, propyl and butyl esters of acetic acid, ethyl and methyl esters of 2-hydroxypropionic acid, ethyl ester of 2-hydroxy-2-methylpropionic acid, methyl, ethyl, and butyl esters of hydroxyacetic acid, methyl lactate, ethyl lactate, propyl lactate, butyl lactate, methyl, ethyl, propyl, and butyl esters of methoxyacetic acid, methyl, ethyl, propyl, and butyl esters of propoxyacetic acid, methyl, ethyl, propyl, and butyl esters of butoxyacetic acid, methyl, ethyl, propyl, and butyl esters of 2-methoxypropionic acid, methyl, ethyl, propyl, and butyl esters of 2-ethoxypropionic acid, methyl, ethyl, propyl, and butyl esters of 2-butoxypropionic acid, methyl, ethyl, propyl, and butyl esters of 3-methoxypropane, methyl, ethyl, propyl, and butyl esters of 3-ethoxypropionic acid, methyl, ethyl, propyl, and butyl esters of 3-butoxypropionic acid; propylene glycol methyl ether acetate, ethylene glycol monomethyl ether acetate, ethylene glycol ethyl ether acetate, propylene glycol monobutyl ether acetate, ethyl iso-butyl ether, ethyl ethoxy propionate, methoxy propanol, butoxy propanol, 2-butoxy ethanol, butyl acetate, 1-butoxy-2-propanol, cyclohexanone, dimethyl ketone, methyl butyl ketone and methyl hexyl ketone.

The solvent may be contained in the ink composition for a color filter at a residual amount, and preferably in an amount of 65 to 85% by weight, based on the total weight of ink composition for a color filter. In this connection, if the content of the solvent is less than 65% by weight, the ink viscosity is increased to remarkably reduce the jetting property. If the content of the solvent is more than 85% by weight, the solid content is lowered increase the number of ink drops necessary for filling pixels in order to produce the same thickness.

In the present invention, the ink composition preferably has a viscosity within the range of 10 to 15 cP, and more preferably within the range of 12 to 14 cP. The ink composition having the viscosity within the above range can be most readily jetted.

Further, the infrared curable ink composition for a color filter may further include a binder.

The binder used in the present invention is a material that improves interface and adhesion properties and readily forms a color filter ink film, and any binder can be used without limitation as long as it does not deteriorate the intrinsic property of the ink composition for a color filter.

The binder polymer may be prepared by copolymerization of one or two selected from the group consisting of styrene, chloro styrene, α-methyl styrene, vinyl toluene, 2-ethylhexyl (meth)acrylate, methyl(meth)acrylate, ethyl(meth)acrylate, butyl(meth)acrylate, benzyl(meth)acrylate, glycidyl(meth)acrylate, dimethylaminoethyl(meth)acrylate, isobutyl(meth)acrylate, t-butyl(meth)acrylate, cyclohexyl(meth)acrylate, dicyclopentanyl(meth)acrylate, isobornyl(meth)acrylate, 2-phenoxyethyl(meth)acrylate, tetrahydrofurfuryl(meth)acrylate, hydroxyethyl(meth)acrylate, 2-hydroxyethyl(meth)acrylate, 2-hydroxypropyl(meth)acrylate, 2-hydroxy-3-chloropropyl(meth)acrylate, 2-hydroxybutyl(meth)acrylate, 4-hydroxybutyl(meth)acrylate, dimethylaminomethyl(meth)acrylate, diethylamino(meth)acrylate, acyloctyloxy-2-hydroxypropyl(meth)acrylate, ethylhexyl acrylate, 2-methoxyethyl(meth)acrylate, 3-methoxybutyl(meth)acrylate, butoxyethyl(meth)acrylate, ethoxydiethyleneglycol(meth)acrylate, methoxytriethyleneglycol(meth)acrylate, methoxytripropyleneglycol(meth)acrylate, methoxypolyethyleneglycol(meth)acrylate, phenoxydiethyleneglycol(meth)acrylate, p-nonylphenoxypolyethyleneglycol(meth)acrylate, p-nonylphenoxypolypropyleneglycol(meth)acrylate, tetrafluoropropyl(meth)acrylate, hexafluoroisopropyl(meth)acrylate, octafluoropentyl(meth)acrylate, heptadecafluorodecyl(meth)acrylate, tribromophenyl(meth)acrylate, methyl α-hydroxymethyl acrylate, ethyl α-hydroxymethyl acrylate, propyl α-hydroxymethyl acrylate, butyl α-hydroxymethyl acrylate, N-phenylmaleimide, N-(4-chlorophenyl)maleimide, methacrylic acid, maleic acid, and itaconic acid. The binder polymers having an average molecular weight from 4000 to 50000 are preferred.

The binder is preferably contained in an amount of 8% by weight or less, based on the total weight of the ink composition for a color filter. If the binder content is more than 8% by weight, the ink viscosity is problematically increased.

Further, the ink composition for a color filter according to the present invention may further include other additives in addition to the above described ingredients. Examples of the additives may include one or more of a plasticizer, an adhesion promoter, a filler, a defoaming agent, a dispersion aid, an anticoagulant, and a surfactant. These additives are preferably contained in an amount of 0.01 to 3% by weight, based on the total weight of the ink composition for a color filter.

Meanwhile, the ink composition of the present invention does not include a photoacid generator, a photoinitiator, an acid catalyst, a thermal initiator or the like. Since the ink composition of the present invention is a composition suitable for the infrared curing process that is performed at high temperature for a short time, the curing reaction occurs within a short period of time by the melamine compound and the epoxy compound to obtain an ink film having excellent chemical resistance, even though the ink composition does not include the above ingredients.

According to an another aspect of the present invention, there is provided a color filter manufactured by using the infrared curable ink composition for a color filter according to the present invention. The color filter may be manufactured in any method, as long as the method employs the ink composition for a color filter. Preferably, the color filter may be manufactured by jetting and curing the ink composition for a color filter on the substrate, on which patterns are formed by the ink jet method.

A material of the substrate is not particularly limited, but a glass substrate, a plastic substrate, or a flexible substrate may be used, and preferably a glass substrate having strong heat resistance.

The curing process of the packed ink composition is preferably performed in accordance with the infrared curing process a temperature of 240 to 300° C. If the temperature is less than 240° C., evaporation and curing of the solvent are not sufficient so as to reduce the film strength and chemical resistance. If the temperature is more than 300° C., an excessive reduction in the volume of pixel area deteriorates adhesion to the substrate and accuracy.

According to a still another aspect of the present invention, there is provided a liquid crystal display device including the color filter according to the present invention. The liquid crystal display device may be used in a TV-LCD or monitor-LCD depending on the use, and exemplified by TN LCD (TWISTED NEMATIC LCD), STN LCD (SUPER TWISTED NEMATIC LCD), FSTN LCD (FILM SUPER TWIST NEMATICS LCD), DSTN LCD DSTN (DOUBLE LAYER SUPER TWISTED NEMATIC LCD), IPS LCD (IN-PLANE SWITCHING LCD), VA LCD (VERTICAL ALIGNMENT LCD), PVA LCD (PATTERNED VERTICAL ALIGNMENT LCD), depending on the operation method and its structure, but is not limited thereto as long as it is used in any field in need of the color filter. The liquid crystal display device according to the present invention may be manufactured by the conventional technique known in the art, except for using the infrared curable ink composition for a color filter of the present invention.

The infrared curable ink composition for a color filter according to the present invention is characterized in that it can be cured for a very short period of time compared to the known ink composition for a color filter and used to produce a color filter having excellent chemical resistance even though the curing process is performed for a short time. Therefore, it has the following characteristics.

First, the production time for the color filter can be greatly, shortened. The conventional baking process employing a thermal convection method requires a curing time of approximately 30 min or longer. However, since the infrared curable ink composition for a color filter according to the present invention can be rapidly cured, it is suitable for the infrared curing process, thereby remarkably simplifying the production process and shortening the time required for color filter production.

Second, thanks to the short curing time, the generation of foreign materials on the substrate can be reduced during the curing process. Because the ink composition for a color filter of the present invention can be used in the infrared curing process, and cured for a short time, the generation of foreign materials on the substrate can be reduced during the curing process. Thus, process and costs required for the removal of the foreign materials can be greatly reduced, thereby improving the process efficiency.

Third, since the ink composition for a color filter according to the present invention is cured for a short time, it has excellent chemical resistance. Therefore, even though it is exposed to chemicals, color difference between each color filter, loss of ink film, or various defectives generated by contamination due to the color filter film can be reduced.

The infrared curable ink composition for a color filter including a melamine compound and an epoxy compound according to the present invention can be cured for a short time, thereby being used in the infrared curing process and simplifying the production process and shortening the time required for color filter production. In addition, thanks to the short curing time, the generation of foreign materials can be reduced during the curing process, and the color filter produced by the ink composition according to the present invention has excellent chemical resistance and heat resistance, thereby being applied to various electronic devices such as liquid crystal display device.

DETAILED DESCRIPTION OF THE PREFERRED EMBODIMENTS

Hereinafter, the preferred Examples are provided for better understanding. However, these Examples are for illustrative purposes only, and the invention is not intended to be limited by these Examples.

Preparation Example 1

Preparation of Binder Resin 1

1.6 parts by weight of V65 (manufactured by Wako pure chemicals) as a thermal initiator was dissolved in a solvent (BCA, Diethylene glycol monobutyl ether acetate) and then benzylmethacrylate/methacrylic acid were added at a molar ratio of 68/32, and reacted in a reaction vessel under nitrogen atmosphere at 65° C. for 7.5 hrs.

The copolymer solution obtained was put in a flask equipped with a stirrer, and glycidylmethacrylate was added thereto, and further reacted at 110° C. for 6 hrs to prepare a thermosetting copolymer. The prepared binder resin had an acid value of 46 KOHmg/g and a weight average molecular weight of 8,300 g/mol.

Preparation Example 2

Preparation of Binder Resin 2

1.6 parts by weight of V65 as a thermal initiator was dissolved in a solvent (BCA) and then benzylmethacrylate/methylmethacrylate/methacrylic acid/hydroxyethylmethacrylate were added at a molar ratio of 30/40/10/20, and reacted in a reaction vessel under nitrogen atmosphere at 65° C. for 7.5 hrs to prepare a binder resin 2. The prepared binder resin had an acid value of 55 KOHmg/g and a weight average molecular weight of 8,700 g/mol.

Example

Preparation of Infrared Curable Ink Composition for a Color Filter

The infrared curable ink composition for a color filter according to the present invention was prepared by the following method. In particular, the infrared curable ink composition for a color filter according to the present invention includes a melamine compound and an epoxy compound. % by weight described in the following is % by weight to the final ink composition for a color filter produced.

Production of Example 1

2.8% by weight of red pigment (R254), 5.7% by weight of red pigment (R177), 1.8% by weight of yellow pigment (Y150), 5.8% by weight of pigment dispersant, and 4.3% by weight of melamine compound (Cymel 303; Cytec Industries Inc.) were first mixed together to prepare a pigment dispersion. 1.6% by weight of melamine compound (Cymel 303; Cytec Industries Inc.), 2.7% by weight of epoxy compound (EPR174(Epikote828)), and 75.3% by weight of solvent (BCA) were further added, and mixed to prepare an infrared curable ink composition for a color filter.

Production of Example 2

2.8% by weight of red pigment (R254), 5.5% by weight of red pigment (R177), 1.8% by weight of yellow pigment (Y150), 5.6% by weight of pigment dispersant, and 4.2% by weight of melamine compound (Cymel 303; Cytec Industries Inc.) were first mixed together to prepare a pigment dispersion. 0.6% by weight of the binder resin of Preparation Example 2, 1.6% by weight of melamine compound (Cymel 303; Cytec Industries Inc.), 2.7% by weight of epoxy compound (EPR174(Epikote828)), and 75.2% by weight of solvent (BCA) were further added, and mixed to prepare an infrared curable ink composition for a color filter.

Production of Example 3

2.8% by weight of red pigment (R254), 5.7% by weight of red pigment (R177), 1.8% by weight of yellow pigment (Y150), 5.8% by weight of pigment dispersant, and 2.3% by weight of melamine compound (Cymel 327; Cytec Industries Inc.) were first mixed together to prepare a pigment dispersion. 3.8% by weight of melamine compound (Cymel 327; Cytec Industries Inc.), 2.5% by weight of epoxy compound (EPR174(Epikote828)), and 75.3% by weight of solvent (BCA) were further added, and mixed to prepare an infrared curable ink composition for a color filter.

Production of Example 4

2.8% by weight of red pigment (R254), 5.7% by weight of red pigment (R177), 1.8% by weight of yellow pigment (Y150), 5.8% by weight of pigment dispersant, and 2.3% by weight of melamine compound (Cymel 327; Cytec Industries Inc.) were first mixed together to prepare a pigment dispersion. 3.8% by weight of melamine compound (Cymel 1130; Cytec Industries Inc.), 2.5% by weight of epoxy compound (EPPN-502H, manufactured by NIPPON KAYAKU Co.), and 75.3% by weight of solvent (BCA) were further added, and mixed to prepare an infrared curable ink composition for a color filter.

Production of Example 5

2.8% by weight of red pigment (R254), 5.7% by weight of red pigment (R177), 1.8% by weight of yellow pigment (Y150), 5.8% by weight of pigment dispersant, and 2.3% by weight of melamine compound (Cymel 327; Cytec Industries Inc.) were first mixed together to prepare a pigment dispersion. 3.8% by weight of melamine compound (Cymel 1130; Cytec Industries Inc.), 2.5% by weight of epoxy compound (NC-7300L, manufactured by NIPPON KAYAKU Co.), and 75.3% by weight of solvent (BCA) were further added, and mixed to prepare an infrared curable ink composition for a color filter.

Production of Example 6

2.8% by weight of red pigment (R254), 5.7% by weight of red pigment (R177), 1.8% by weight of yellow pigment (Y150), 5.8% by weight of pigment dispersant, and 2.3% by weight of melamine compound (Cymel 327; Cytec Industries Inc.) were first mixed together to prepare a pigment dispersion. 3.8% by weight of melamine compound (Cymel 1130; Cytec Industries Inc.), 2.5% by weight of epoxy compound (EPPN-501H, manufactured by NIPPON KAYAKU Co.), and 75.3% by weight of solvent (BCA) were further added, and mixed to prepare an infrared curable ink composition for a color filter.

Production of Comparative Example 1

2.8% by weight of red pigment (R254), 5.7% by weight of red pigment (R177), 1.8% by weight of yellow pigment (Y150), 5.8% by weight of pigment dispersant, and 4.3% by weight of melamine compound (Cymel 303; Cytec Industries Inc.) were first mixed together to prepare a pigment dispersion. 1.3% by weight of the binder resin of Preparation Example 1, 2.5% by weight of polymerizable monomer (DPHA), 0.5% by weight of thermal initiator, and 75.3% by weight of solvent (BCA) were further added, and mixed to prepare an infrared curable ink composition for a color filter.

Production of Comparative Example 2

2.8% by weight of red pigment (R254), 5.7% by weight of red pigment (R177), 1.8% by weight of yellow pigment (Y150), 5.8% by weight of pigment dispersant, and 4.3% by weight of melamine compound (Cymel 303; Cytec Industries Inc.) were first mixed together to prepare a pigment dispersion. 4.3% by weight of melamine compound (Cymel 303; Cytec Industries Inc.) and 75.3% by weight of solvent (BCA) were further added, and mixed to prepare an infrared curable ink composition for a color filter.

Production of Comparative Example 3

2.8% by weight of red pigment (R254), 5.7% by weight of red pigment (R177), 1.8% by weight of yellow pigment (Y150), and 5.8% by weight of pigment dispersant were first mixed together to prepare a pigment dispersion. 2.4% by weight of the binder resin of Preparation Example 1, 5.7% by weight of polymerizable monomer (DPHA), 0.5% by weight of thermal initiator, and 75.3% by weight of solvent (BCA) were further added, and mixed to prepare an infrared curable ink composition for a color filter.

Production of Comparative Example 4

2.8% by weight of red pigment (R254), 5.7% by weight of red pigment (R177), 1.8% by weight of yellow pigment (Y150), 5.8% by weight of pigment dispersant, and 4.3% by weight of melamine compound (Cymel 303; Cytec Industries Inc.) were first mixed together to prepare a pigment dispersion. 1.1% by weight of the binder resin of Preparation Example 1, 3.2% by weight of melamine compound (Cymel 303; Cytec Industries Inc.) and 75.3% by weight of solvent (BCA) were further added, and mixed to prepare an infrared curable ink composition for a color filter.

Production of Comparative Example 5

An ink composition for a color filter was prepared in the same manner as in Example 4. However, convection oven curing was performed using the above composition in the following Experimental Examples, instead of performing the infrared curing.

Production of Comparative Example 6

2.8% by weight of red pigment (R254), 5.7% by weight of red pigment (R177), 1.8% by weight of yellow pigment (Y150), and 5.8% by weight of pigment dispersant were first mixed together to prepare a pigment dispersion. 3% by weight of melamine compound (Cymel 1130; Cytec Industries Inc.), 12% by weight of epoxy compound (EPPN-502H, manufactured by NIPPON KAYAKU Co.), and 68.9% by weight of solvent (BCA) were further added, and mixed to prepare an infrared curable ink composition for a color filter. (molar ratio of melamine compound:epoxy compound=0.25:1)

Production of Comparative Example 7

2.8% by weight of red pigment (R254), 5.7% by weight of red pigment (R177), 1.8% by weight of yellow pigment (Y150), and 5.8% by weight of pigment dispersant were first mixed together to prepare a pigment dispersion. 12% by weight of melamine compound (Cymel 1130; Cytec Industries Inc.), 2.5% by weight of epoxy compound (EPPN-502H, manufactured by NIPPON KAYAKU Co.), and 69.4% by weight of solvent (BCA) were further added, and mixed to prepare an infrared curable ink composition for a color filter. (molar ratio of melamine compound:epoxy compound=4.8:1)

The compositions of Examples and Comparative Examples are summarized in the following Table 1. The values in parenthesis mean % by weight to the final ink composition for a color filter.

TABLE 1

| Ink composition | Pigment[a] | Pigment dispersant | Melamine compound | Epoxy compound | Non-epoxy compound | Binder | Solvent (BCA) | Additive |
|---|---|---|---|---|---|---|---|---|
| Example 1 | (2.8) (5.7) (1.8) | (5.8) | Cymel 303 (5.9) | EPR174(Epikote828) (2.7) | | | (75.3) | |
| Example 2 | (2.8) (5.7) (1.8) | (5.6) | Cymel 303 (5.8) | EPR174(Epikote828) (2.7) | | Preparation Example 2 (0.6) | (75.2) | |
| Example 3 | (2.8) (5.7) (1.8) | (5.8) | Cymel 327 (6.1) | EPR174(Epikote828) (2.5) | | | (75.3) | |
| Example 4 | (2.8) (5.7) (1.8) | (5.8) | Cymel 327 (2.3) Cymel 1130 (3.8) | EPPN-502H (2.5) | | | (75.3) | |
| Example 5 | (2.8) (5.7) (1.8) | (5.8) | Cymel 327 (2.3) Cymel 1130 (3.8) | NC-7300L (2.5) | | | (75.3) | |
| Example 6 | (2.8) (5.7) (1.8) | (5.8) | Cymel 327 (2.3) Cymel 1130 (3.8) | EPPN-501H (2.5) | | | (75.3) | |
| Comparative Example 1 | (2.8) (5.7) (1.8) | (5.8) | Cymel 303 (4.3) | | DPHA (2.5) | Preparation Example 1 (1.3) | (75.3) | thermal initiator (0.5) |
| Comparative Example 2 | (2.8) (5.7) (1.8) | (5.8) | Cymel 303 (8.6) | | | | (75.3) | |
| Comparative Example 3 | (2.8) (5.7) (1.8) | (5.8) | | | DPHA (5.7) | Preparation Example 1 (2.4) | (75.3) | thermal initiator (0.5) |
| Comparative Example 4 | (2.8) (5.7) (1.8) | (5.8) | Cymel 303 (7.5) | | | Preparation Example 1 (1.1) | (75.3) | |
| Comparative Example 5 | (2.8) (5.7) (1.8) | (5.8) | Cymel 327 (2.3) Cymel 1130 (3.8) | EPPN-502H (2.5) | | | (75.3) | |
| Comparative Example 6 | (2.8) (5.7) (1.8) | (5.8) | Cymel 1130 (3) | EPPN-502H (12) | | | (68.9) | |
| Comparative Example 7 | (2.8) (5.7) (1.8) | (5.8) | Cymel 1130 (12) | EPPN-502H (2.5) | | | (69.4) | |

[a]pigment represents R254, R177, and Y150 and their content is shown in order

Experimental Example 1

Evaluation of Chemical Resistance

To evaluate chemical resistance of the compositions prepared in Examples and Comparative Examples, the following experiment was performed.

The infrared curable ink compositions for a color filter prepared in Examples 1-6 and the ink compositions for a color filter of Comparative Examples 1-4 and 6-7 were applied to washed glasses, and pre-baked at 90° C. for 3 min, and then, the infrared curing (IR curing) process was performed for 115 sec (conditions: temperature was raised for 90 sec and maintained at 260° C. for 25 sec) to completely cure the ink. The ink composition for a color filter of Comparative Example 5 was subjected to convection oven curing at 220 to 230 ° C. for 2 min, instead of performing the infrared curing.

The obtained ink coating film (thickness: 1 to 2 μm) was immersed in a 45° C. NMP (N-Methyl Pyrrolidinone) solution for 1 hr, and then color difference (ΔEab) before and after immersion in the NMP solution was evaluated (color difference (ΔEab)<3 considered as in good condition), and the results are shown in the following Table 2.

TABLE 2

| Ink composition | Chemical resistance (ΔEab) | Evaluation |
|---|---|---|
| Example 1 | 1.05 | ○ |
| Example 2 | 1.44 | ○ |
| Example 3 | 1.41 | ○ |
| Example 4 | 1.16 | ○ |
| Example 5 | 1.06 | ○ |
| Example 6 | 1.21 | ○ |
| Comparative Example 1 | 3.53 | x |
| Comparative Example 2 | 3.07 | x |
| Comparative Example 3 | 45.25 | x |
| Comparative Example 4 | 4.67 | x |
| Comparative Example 5 | 30.6 | x |
| Comparative Example 6 | Jetting impracticable | |
| Comparative Example 7 | Jetting impracticable | |

* Color difference (ΔEab) <3: ○, Color difference (ΔEab) ≧3: x

As shown in Table 2, a slight color difference was observed in the infrared curable ink composition for a color filter of the present invention before and after immersion in the NMP solution, indicating that the ink composition of the present invention was cured sufficiently even for a short curing time, and thus can be used in the infrared curing process.

Meanwhile, a great color difference was observed in the ink compositions of Comparative Examples before and after immersion in the NMP solution, indicating that the ink compositions were not sufficiently cured by the rapid curing process, thereby reducing chemical resistance, unlike the conventional process by a thermal convection method. In particular, since the ink compositions for a color filter of Comparative Examples 6 and 7 had very high viscosity and bad storage stability, it was not possible to perform the jetting itself.

Experimental Example 2

Evaluation of Chemical Resistance Under High Temperature Condition (Heat Resistance)

To evaluate the chemical resistance, that is, heat resistance of the compositions of Examples 1-6 and Comparative Examples 1-7 under high temperature condition, the following experiment was performed.

The evaluation of the chemical resistance was performed in the same manner as in Experimental Example 1, except that the evaluation of the chemical resistance was performed under the immersion conditions of 80° C. for 40 min. The results are shown in Table 3. In Table 3, color difference less than 20, preferably 5 to 20, was considered as, in good condition

TABLE 3

| Ink composition | Chemical resistance (ΔEab) | Evaluation |
|---|---|---|
| Example 1 | 16.47 | ○ |
| Example 2 | 17.11 | ○ |
| Example 3 | 13.81 | ○ |
| Example 4 | 9.45 | ○ |
| Example 5 | 17.94 | ○ |
| Example 6 | 9.52 | ○ |
| Comparative Example 1 | not measurable | |
| Comparative Example 2 | not measurable | |
| Comparative Example 3 | not measurable | |
| Comparative Example 4 | not measurable | |
| Comparative Example 5 | 103 | x |
| Comparative Example 6 | not measurable | |
| Comparative Example 7 | not measurable | |

* Color difference (ΔEab) <20: ○, Color difference (ΔEab) ≧20: x

As shown in Table 3, the compositions of Examples using the melamine and epoxy compounds showed good chemical resistance at a high temperature of 80° C. In particular, the compositions of Examples 4 and 6 using novolac-type epoxy were found to have good chemical resistance.

Meanwhile, in the compositions of Comparative Examples, excluding that of Comparative Example 5, the ink film was melted out, and thus color difference was not measurable. A great color difference was observed in the composition of Comparative Example 5 before and after immersion in the NMP solution.

Taken together, the infrared curable ink composition for a color filter including melamine and epoxy compounds the present invention did not show a great color difference before and after immersion in the NMP solution under the curing conditions of high temperature and short time, indicating that the ink composition of the present invention was sufficiently cured by the infrared curing process at high temperature for a short time, and thus can suitably used in the infrared curing process. In particular, when using novolac-type epoxy as an epoxy compound, more excellent chemical resistance and heat resistance can be ensured. When the temperature of the infrared curing process is increased, the curing process can be performed for a shorter curing time. Thefore, from the viewpoint of reducing the production process, it can be seen that the ink composition of the present invention has excellent effects.

What is claimed is:

1. An infrared curable ink composition for a color filter, comprising one or more melamine compounds represented by the following Formula 1;

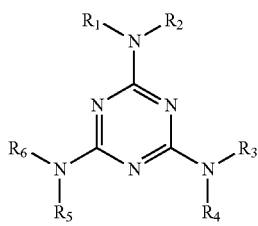

[Formula 1]

wherein $R_1$, $R_2$, $R_3$, $R_4$, $R_5$ and $R_6$ are each independently selected from the group consisting of functional groups including hydrogen, a hydroxy group, a $C_1$-$C_6$ alkyl group, a $C_1$-$C_6$ alkoxy group, a $C_1$-$C_6$ carboxyl group, a $C_1$-$C_6$ alkoxy methyl group, a $C_1$-$C_6$ alcohol group, a phenyl group, an acryl group and a vinyl group, and at least one of $R_1$ to $R_6$ is a $C_1$-$C_6$ alcohol group or a $C_1$-$C_6$ alkoxy methyl group; and an epoxy compound, which is one or more selected from the group consisting of bisphenol A epoxy, bisphenol F epoxy, brominated bisphenol A epoxy, bisphenol S epoxy, diphenyl ether epoxy, hydroquinone epoxy, naphthalene epoxy, biphenyl epoxy, fluorine epoxy, novolac epoxy, tris hydroxyl phenyl methane epoxy, trifunctional epoxy, tetraphenylethane epoxy, dicyclo pentadiene phenol epoxy, hydrogenated bisphenol A epoxy, bisphenol A-containing nuclear polyol epoxy, polypropylene glycol epoxy, glycidyl ester epoxy, glycidyl amine epoxy, linear aliphatic epoxy, alicylic epoxy and heterocyclic epoxy, wherein a molar ratio of the melamine compound and the epoxy compound is 0.5 to 4:1, and wherein the infrared curable ink composition does not comprise a photoacid generator, a photoinitiator, an acid catalyst, or a thermal initiator.

2. The infrared curable ink composition for a color filter according to claim 1, wherein the epoxy compound is a novolac epoxy compound.

3. The infrared curable ink composition for a color filter according to claim 2, wherein the novolac epoxy compound is one or more selected from the group consisting of phenol novolac epoxy, cresol novolac epoxy, BPA novolac epoxy and substituted epoxy.

4. The infrared curable ink composition for a color filter according to claim 1, wherein $R_1$, $R_2$, $R_3$, $R_4$, $R_5$ and $R_6$ are each independently selected from the group consisting of hydrogen, a hydroxy group, a $C_1$-$C_6$ alkyl group, a $C_1$-$C_6$ alkoxy group, a methylalcohol group, a $C_1$-$C_6$ alkoxy methyl group and an acryl group.

5. The infrared curable ink composition for a color filter according to claim 1, wherein the melamine compound is a compound represented by the following Formula 2 or 3:

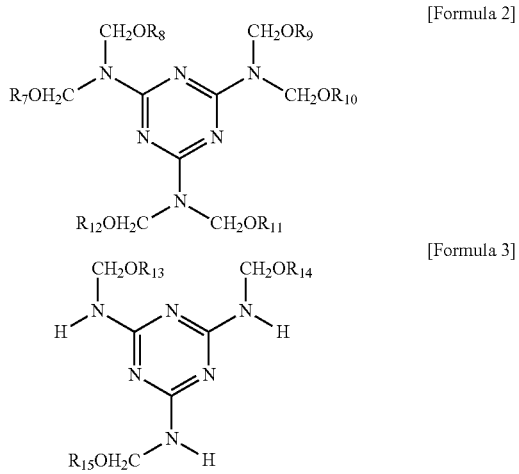

wherein $R_7$, $R_8$, $R_9$, $R_{10}$, $R_{11}$, $R_{12}$, $R_{13}$, $R_{14}$ and $R_{15}$ are each independently selected from the group consisting of hydrogen and a $C_1$-$C_6$ alkyl group.

6. The infrared curable ink composition for a color filter according to claim 1, wherein the infrared curable ink composition for a color filter further comprises a pigment; a pigment dispersant; and a solvent.

7. The infrared curable ink composition for a color filter according to claim 6, wherein the pigment dispersant is selected from the group consisting of polyethylene imine-based, urethane resin-based, acryl resin-based and polyester-based polymer materials.

8. The infrared curable ink composition for a color filter according to claim 6, wherein the solvent is one or more selected from the group consisting of ethylene glycol monobutyl ether acetate, diethylene glycol monobutyl ether acetate, diethylene glycol monoethyl ether acetate, diethylene glycol monomethyl ether acetate, dipropylene glycol monomethyl ether acetate, dipropylene glycol ethyl ether acetate, dipropylene glycol propyl ether acetate, dipropylene glycol monobutyl ether acetate, diethylene glycol monomethyl ether, diethylene glycol monoethyl ether, diethylene glycol monopropyl ether, diethylene glycol monobutyl ether, diethylene glycol monohexyl ether, triethylene glycol monomethyl ether, triethylene glycol monoethylether, triethylene glycol monobutylether, triethylene glycol monopropyl ether, dipropylene glycol monobutyl ether, tripropylene glycol monomethyl ether, tripropylene glycol monobutyl ether, diethylene glycol dimethylether, diethylene glycol diethylether, methylethylketone, cyclohexanone, 4-hydroxy-4-methyl-2-pentanone, methyl, ethyl, propyl, and butyl esters of acetic acid, ethyl, and methyl esters of 2-hydroxypropionic acid, ethyl ester of 2-hydroxy-2-methylpropionic acid, methyl, ethyl, and butyl esters of hydroxyacetic acid, methyl lactate, ethyl lactate, propyl lactate, butyl lactate, methyl, ethyl, propyl, and butyl esters of methoxyacetic acid, methyl, ethyl, propyl, and butyl esters of propoxyacetic acid, methyl, ethyl, propyl, and butyl esters of butoxyacetic acid, methyl, ethyl, propyl, and butyl esters of 2-methoxypropionic acid, methyl, ethyl, propyl, and butyl esters of 2-ethoxypropionic acid, methyl, ethyl, propyl, and butyl esters of 2-butoxypropionic acid, methyl, ethyl, propyl, and butyl esters of 3-methoxypropane, methyl, ethyl, propyl, and butyl esters of 3-ethoxypropionic acid, methyl, ethyl, propyl, and butyl esters of 3-butoxypropionic acid, propylene glycol methyl ether acetate, ethylene glycol monomethyl ether acetate, ethylene glycol ethyl ether acetate, propylene glycol monobutyl ether acetate, ethyl iso-butyl ether, ethyl ethoxy propionate, methoxy propanol, butoxy propanol, 2-butoxy ethanol, butyl acetate, 1-butoxy-2-propanol, cyclohexanone, dimethyl ketone, methyl butyl ketone and methyl hexyl ketone.

9. The infrared curable ink composition for a color filter according to claim 6, wherein 5 to 20% by weight of the pigment, 1 to 15% by weight of the pigment dispersant, 0.5 to 10% by weight of the melamine compound; 0.5 to 10% by weight of the epoxy compound; and a residual amount of the solvent are contained, based on the total weight of the infrared curable ink composition for a color filter.

10. The infrared curable ink composition for a color filter according to claim 1, wherein the infrared curable ink composition for a color filter further comprises one or more binders selected from the group consisting of polymers that are prepared by copolymerization of one or two selected from the group consisting of styrene, chloro styrene, α-methyl styrene, vinyl toluene, 2-ethylhexyl(meth)acrylate, methyl (meth)acrylate, ethyl (meth)acrylate, butyl (meth)acrylate, benzyl (meth)acrylate, glycidyl (meth)acrylate, dimethylaminoethyl (meth)acrylate, isobutyl (meth)acrylate, t-butyl (meth)acrylate, cyclohexyl (meth)acrylate, dicyclopentanyl(meth)acrylate, isobornyl (meth)acrylate, 2-phenoxyethyl (meth)acrylate, tetrahydrofurfuryl (meth)acrylate, hydroxyethyl (meth)acrylate, 2-hydroxyethyl(meth)acrylate, 2-hydroxypropyl (meth)acrylate, 2-hydroxy-3-chloropropyl (meth)acrylate, 2-hydroxybutyl (meth)acrylate, 4-hydroxybutyl (meth)acrylate, dimethylaminomethyl(meth)acrylate, diethylamino (meth)acrylate, acyloctyloxy-2-hydroxypropyl (meth)acrylate, ethylhexyl acrylate, 2-methoxyethyl (meth)acrylate, 3-methoxybutyl (meth)acrylate, butoxyethyl(meth)acrylate, ethoxydiethyleneglycol (meth)acrylate, methoxytriethyleneglycol (meth)acrylate, methoxytripropyleneglycol (meth)acrylate, methoxypolyethyleneglycol (meth)acrylate , phenoxydiethyleneglycol (meth)acrylate, p-nonylphenoxypolyethyleneglycol (meth)acrylate, p-nonylphenoxypolypropyleneglycol (meth)acrylate, tetrafluoropropyl (meth)acrylate, 1,1,1,3,3,3-hexafluoroisopropyl (meth)acrylate, octafluoropentyl (meth)acrylate, heptadecafluorodecyl (meth)acrylate, tribromophenyl (meth)acrylate, methyl α-hydroxymethyl acrylate, ethyl α-hydroxymethyl acrylate, propyl α-hydroxymethyl acrylate, butyl α-hydroxymethyl acrylate, N-phenylmaleimide, N-(4-chlorophenyl)maleimide, methacrylic acid, maleic acid, and itaconic acid.

11. The infrared curable ink composition for a color filter according to claim 10, wherein the binder is contained in an amount of 8% by weight or less, based on the total weight of the infrared curable ink composition for a color filter.

12. A color filter produced by the infrared curable ink composition for a color filter according to claim 1.

13. A liquid crystal display device comprising the color filter of claim 12.

* * * * *